US012576449B2

(12) United States Patent     (10) Patent No.:   US 12,576,449 B2

Yanagihara et al.     (45) Date of Patent:    Mar. 17, 2026

(54) PROCESSING TOOL

(71) Applicant: SUGINO MACHINE LIMITED,
Namerikawa City (JP)

(72) Inventors: Yusuke Yanagihara, Namerikawa City
(JP); Akihiro Ishitani, Namerikawa
City (JP)

(73) Assignee: SUGINO MACHINE LIMITED,
Namerikawa City (JP)

( * ) Notice: Subject to any disclaimer, the term of this
patent is extended or adjusted under 35
U.S.C. 154(b) by 56 days.

(21) Appl. No.: 18/676,981

(22) Filed: May 29, 2024

(65) Prior Publication Data

US 2024/0399467 A1     Dec. 5, 2024

(30) Foreign Application Priority Data

Jun. 5, 2023    (JP) ................................. 2023-092144

(51) Int. Cl.
    *B23B 31/02*       (2006.01)
    B23B 31/107      (2006.01)

(52) U.S. Cl.
    CPC ........ *B23B 31/028* (2013.01); *B23B 31/1071*
         (2013.01); *B23B 31/10741* (2021.01)

(58) Field of Classification Search
    CPC .............. B23B 31/028; B23B 31/1071; B23B
         2260/096; B23B 2260/136; B23B 31/083;
         B23B 31/10741; B23B 31/06; B23B
         31/1079; B23B 31/1173; Y10T 279/1087;
         Y10T 279/1037
See application file for complete search history.

(56) References Cited

U.S. PATENT DOCUMENTS

| | | | | |
|---|---|---|---|---|
| 1,031,914 A | * | 7/1912 | Clouse ................... | B23B 31/02 |
| | | | | 408/239 R |
| 1,946,158 A | * | 2/1934 | Gorg ................ | B23B 31/10741 |
| | | | | 279/66 |
| 3,658,351 A | * | 4/1972 | Benjamin ........... | B23B 31/1071 |
| | | | | 279/75 |
| 3,788,658 A | * | 1/1974 | Benjamin ............... | B23B 31/06 |
| | | | | 279/155 |
| 4,063,488 A | * | 12/1977 | Kagerer ................ | B23B 31/261 |
| | | | | 279/57 |
| 4,197,886 A | * | 4/1980 | MacDonald ........ | B23B 31/1071 |
| | | | | 408/56 |

(Continued)

FOREIGN PATENT DOCUMENTS

JP         7260612 B1     4/2023

*Primary Examiner* — Sara Addisu

(74) *Attorney, Agent, or Firm* — United IP Counselors,
LLC

(57)            ABSTRACT

A processing tool includes: a body including a cylinder
chamber having an opening toward a distal end, and a slide
groove extending parallel to the cylinder chamber; a tool
received in the cylinder chamber in a detachably attachable
manner, and having an anti-rotation groove on an outer
periphery; an anti-rotation body disposed in the body and
advance to or retract from the cylinder chamber; a pusher
disposed in the cylinder chamber in a reciprocable manner,
and urges the tool toward the distal end, the pusher includ-
ing, a pusher body, a retaining body received in the slide
groove, and an advance-retract spring disposed on a basal
end of the pusher in the cylinder chamber, and urge the
pusher toward the distal end.

20 Claims, 9 Drawing Sheets

(56)            References Cited

U.S. PATENT DOCUMENTS

| | | | |
|---|---|---|---|
| 4,604,009 A * | 8/1986 | Tennerstedt | B23B 29/046 |
| | | | 279/57 |
| 5,722,805 A * | 3/1998 | Giffin | B25B 23/0042 |
| | | | 408/239 R |
| 5,934,846 A * | 8/1999 | Ishii | B23B 31/1071 |
| | | | 279/81 |
| 6,199,872 B1 * | 3/2001 | Hasan | B25B 23/0042 |
| | | | 279/155 |
| 6,270,085 B1 * | 8/2001 | Chen | B25B 21/007 |
| | | | 279/22 |
| 6,843,484 B2 * | 1/2005 | Schroeder | B23B 31/1253 |
| | | | 279/58 |
| 6,966,730 B1 * | 11/2005 | Miyanaga | B23B 31/1071 |
| | | | 279/155 |
| 7,134,818 B2 * | 11/2006 | Mazza' | B23B 31/08 |
| | | | 409/141 |
| 9,873,155 B1 * | 1/2018 | Wienhold | B23B 31/22 |
| 11,065,744 B2 * | 7/2021 | Zimmermann | B23B 31/1071 |
| 2007/0052183 A1 * | 3/2007 | Draudt | B23B 31/123 |
| | | | 279/63 |
| 2008/0190251 A1 * | 8/2008 | Huang | B25B 23/0035 |
| | | | 81/438 |
| 2017/0209973 A1 * | 7/2017 | Chen | B23B 31/20125 |
| 2023/0278090 A1 * | 9/2023 | Ishitani | B23B 31/1071 |
| 2024/0399467 A1 * | 12/2024 | Yanagihara | B23C 3/12 |
| 2025/0025946 A1 * | 1/2025 | Yanagihara | B23C 3/12 |
| 2025/0083343 A1 * | 3/2025 | Yanagihara | B26B 29/02 |

* cited by examiner

PROCESSING TOOL

CROSS-REFERENCE TO RELATED APPLICATIONS

This application claims the benefit of priority to Japanese Patent Application No. 2023-092144, filed on Jun. 5, 2023, the entire contents of which are hereby incorporated by reference.

BACKGROUND

1. Technical Field

The present invention relates to a processing tool.

2. Description of the Background

Conventionally, a deburring tool capable of adjusting a pressing force of a cutting tool against a workpiece has been proposed (for example, Japanese Patent No. 7260612). The conventional deburring tool includes a shank, a cylinder chamber, a body having an anti-rotation body holding hole and a tool holder holding hole, a pusher, an elastic body for urging the pusher toward a distal end, a tool holder having an anti-rotation body groove and a tool holding hole, and a cover disposed outside the body and capable of reciprocating between a detachable position and a processing position along the shank axis, the cover having a holding surface covering the anti-rotation body holding hole at the processing position and a relief portion, and an anti-rotation body accommodated in the relief portion when the cover is positioned at the detachable position and the tool holder is pulled out from the tool holder holding hole.

BRIEF SUMMARY

In general, it is preferable to change the elastic body that urges the pusher toward the distal end depending on the material of the workpiece and a chamfer width. In addition, the elastic body may be replaced due to a product lifetime.

When the elastic body cannot be replaced from the distal end of the deburring tool, the deburring tool needs to be disassembled. This requires the user to do some work.

An object of the present invention is to provide a processing tool that allows a pusher to be detachably attachable with a simple structure for an advance-retract spring to be replaced from the distal end.

A first aspect of the present invention provides a processing tool, including:

a body including, a cylinder chamber extending along the body, the cylinder chamber having an opening toward a distal end, and a slide groove extending parallel to the cylinder chamber;

a tool received in the cylinder chamber in a detachably attachable manner, the tool having an anti-rotation groove on an outer periphery;

an anti-rotation body disposed in the body, the anti-rotation body configured to advance to or retract from the cylinder chamber;

a pusher disposed in the cylinder chamber in a reciprocable manner, the pusher configured to urge the tool toward the distal end, the pusher including, a pusher body, a retaining body radially protruding from the pusher body to be received in the slide groove, and an openable elastic body configured to urge the retaining body radially outward; and an advance-retract spring disposed on a basal end of the pusher in the cylinder chamber, the advance-retract spring configured to urge the pusher toward the distal end.

The processing tool is, for example, a deburring tool, a drilling tool, a thread cutting tool, or a brush tool.

The deburring tool is attached to a machining apparatus to remove burrs adhered to the workpiece. The machining apparatus is, for example, a machining center, a lathe, a turning center, or a robot.

For convenience of explanation, the side to which the tip tool is attached is referred to as a distal end side, and the opposite side is referred to as a basal end side.

The tool may include a floater and a tip tool. The anti-rotation groove is disposed on the floater. The tip tool is, for example, a rotary bar or a brush.

The receiving portion is a receiving groove or a receiving hole. The receiving portion extends radially. The receiving groove is disposed on a distal end surface of the slider. The lever is disposed on the retaining body or the openable elastic body. The lever is exposed to the distal end side of the pusher.

The operation of the lever includes moving the lever radially inward.

The processing tool according to the present invention allows the pusher to be detachably attachable with a simple structure for the advance-retract spring to be replaced from the distal end.

DETAILED DESCRIPTION

First Embodiment

Figure 1:
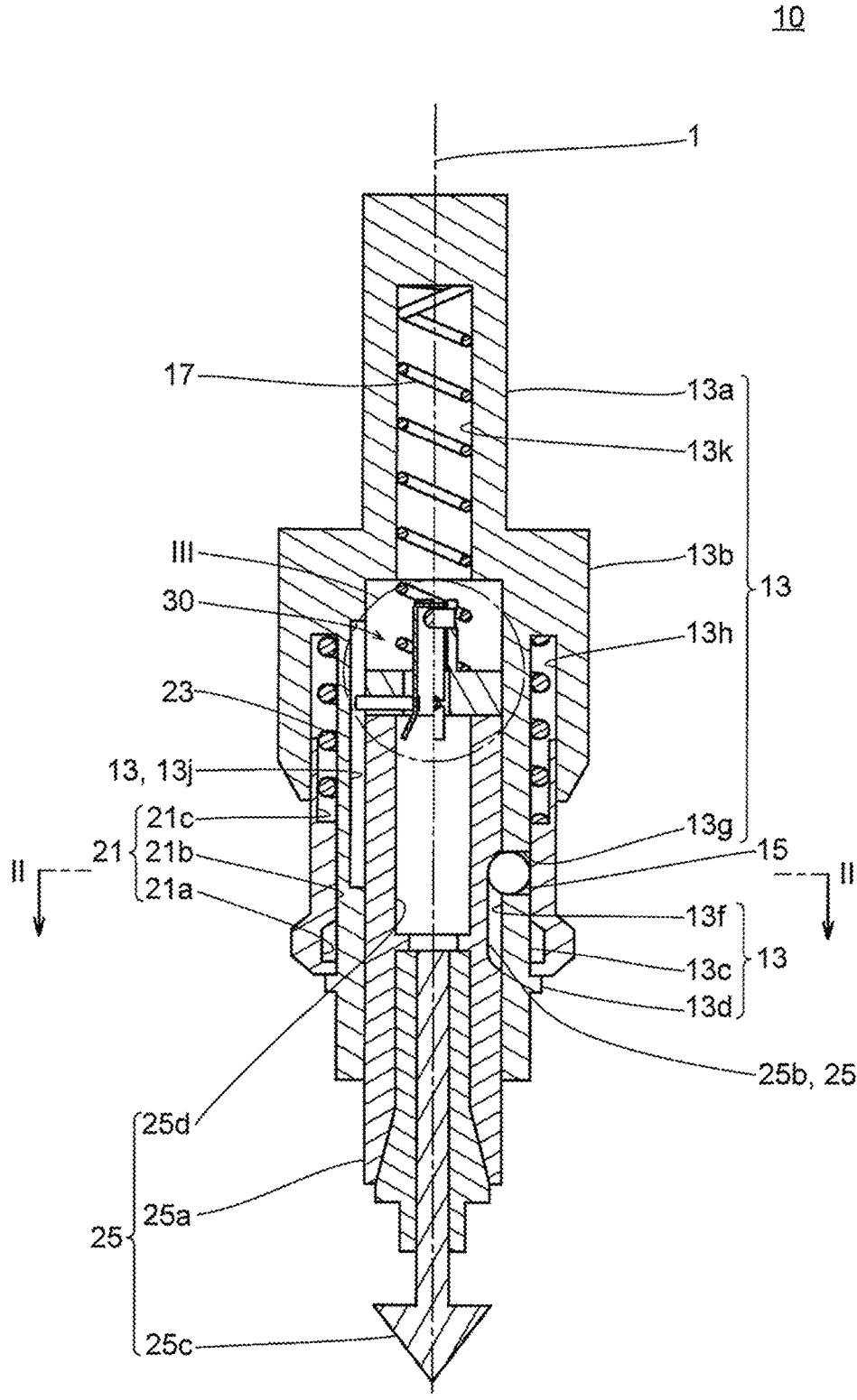
FIG. 1 is a longitudinal sectional view of a processing tool according to a first embodiment.

As shown in FIG. 1, a processing tool 10 according to the present embodiment includes a body 13, a ball (anti-rotation body) 15, a trigger 21, a trigger spring 23, a tool 25, an advance-retract spring (second elastic body) 17, and a pusher 30. The processing tool 10 is mounted on, for example, a spindle of a machining center and rotates about a central axis 1. FIG. 1 is a sectional view taken along line I-I in FIG. 2.

The body 13 includes a shank 13a, a body block 13b, a ball hole (anti-rotation body holding hole) 13g, a cylinder body 13c, a cylinder chamber 13f, a pair of slide grooves 13j, a stop ring 13d, an advance-retract spring chamber 13k, and a first trigger spring chamber 13h.

Figure 2:
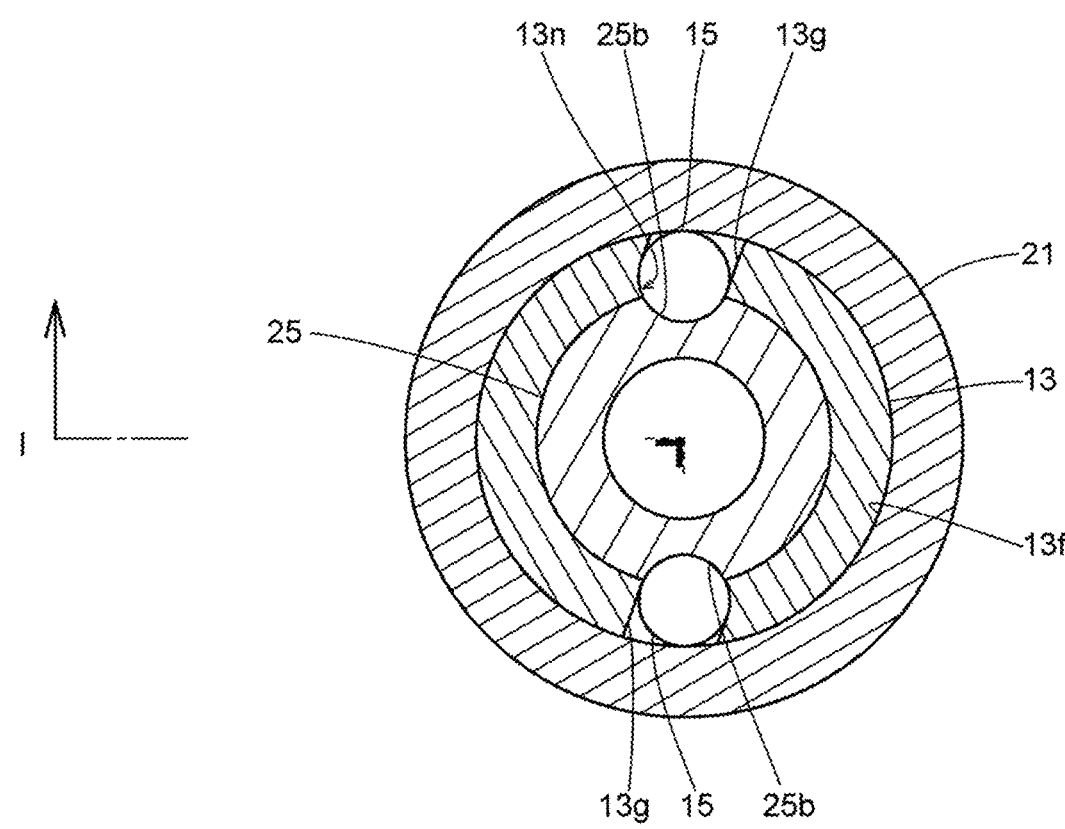
FIG. 2 is an enlarged cross-sectional view taken along line II-II in FIG. 1.
Figure 2:

The shank 13a is connected to a basal end of the body block 13b. The body block 13b is hollow-cylindrical. The cylinder body 13c, which is hollow-cylindrical, is disposed inside the body block 13b. The ball hole 13g is disposed in a central portion of the cylinder body 13c. As shown in FIG. 2, the ball hole 13g is inclined with respect to a radial direction in a cross section to pass through the cylinder body 13c. The radially inner end of the ball hole 13g has a spherical portion 13n.

The cylinder chamber 13f, which opens at the distal end of the cylinder body 13c, extends along the central axis 1. The slide groove 13j extends parallel to the central axis 1 on a cylindrical surface of the cylinder chamber 13f. The pair of slide grooves 13j are arranged axially symmetrically about the central axis 1. The stop ring 13d is disposed at the distal end of the cylinder body 13c.

The advance-retract spring chamber 13k, which is disposed at the basal end of the cylinder chamber 13f, is connected to the cylinder chamber 13f. The first trigger spring chamber 13h is disposed inside the body block 13b and outside the cylinder body 13c. The first trigger spring chamber 13h opens to a distal end of the body block 13b.

The slide groove 13j may pass radially through the cylinder body 13c.

The ball 15 is disposed inside the ball hole 13g. The ball 15 is in contact with the spherical portion 13n. The ball 15 can protrude into the cylinder chamber 13f.

The trigger 21, which is hollow-cylindrical, is arranged radially outward from the cylinder body 13c. The trigger 21 reciprocates along the central axis 1. The trigger 21 includes a relief portion 21a, a holding surface 21b, and a second trigger spring chamber 21c. The holding surface 21b, which is an inner cylindrical surface of the trigger 21, slides on an outer surface of the cylinder body 13c. The holding surface 21b pushes the ball 15 radially inward when the trigger 21 is positioned at the distal end. The relief portion 21a is a ring-shaped groove located at the distal end portion of the holding surface 21b. The trigger 21 can move toward the basal end. The second trigger spring chamber 21c is disposed at the basal end portion of the trigger 21. The second trigger spring chamber 21c is connected to the first trigger spring chamber 13h.

As the trigger 21 moves toward the basal end, the relief portion 21a overlaps the ball hole 13g. At this time, the ball 15 moves radially outward to be received in the relief portion 21a. When the ball 15 is completely removed from the cylinder chamber 13f, the tool 25 is detachably attachable to the cylinder chamber 13f.

The trigger spring 23 is, for example, a compression coil spring. The trigger spring 23 is disposed between the second trigger spring chamber 21c and the first trigger spring chamber 13h. The trigger spring 23 urges the trigger 21 toward the distal end. The stop ring 13d stops the trigger 21 at the distal end.

The pusher 30 is disposed in the cylinder chamber 13f. The advance-retract spring 17 is, for example, a compression coil spring. The advance-retract spring 17, which is disposed between the advance-retract spring chamber 13k and the pusher 30, urges the pusher 30 toward the distal end.

The tool 25 includes a floater 25a, a tip tool 25c, and a lever receiving hole 25d. The floater 25a has a pair of anti-rotation grooves 25b. The floater 25a, which has a cylindrical shape, advances and retract along the central axis 1 inside the cylinder chamber 13f. The pair of anti-rotation grooves 25b, which are arranged axially symmetrically with respect to the central axis 1, extend parallel to the central axis 1. The tip tool 25c is attached to the floater 25a by, for example, a collet. The lever receiving hole 25d is located at the basal end portion of the floater 25a. The lever receiving hole 25d receives a lever 37b (described later). The tip tool 25c and the floater 25a may be integrally formed. The tool 25 is inserted into the cylinder chamber 13f.

The ball 15 is inserted into the anti-rotation groove 25b. The pusher 30 urges the tool 25.

Figure 3:
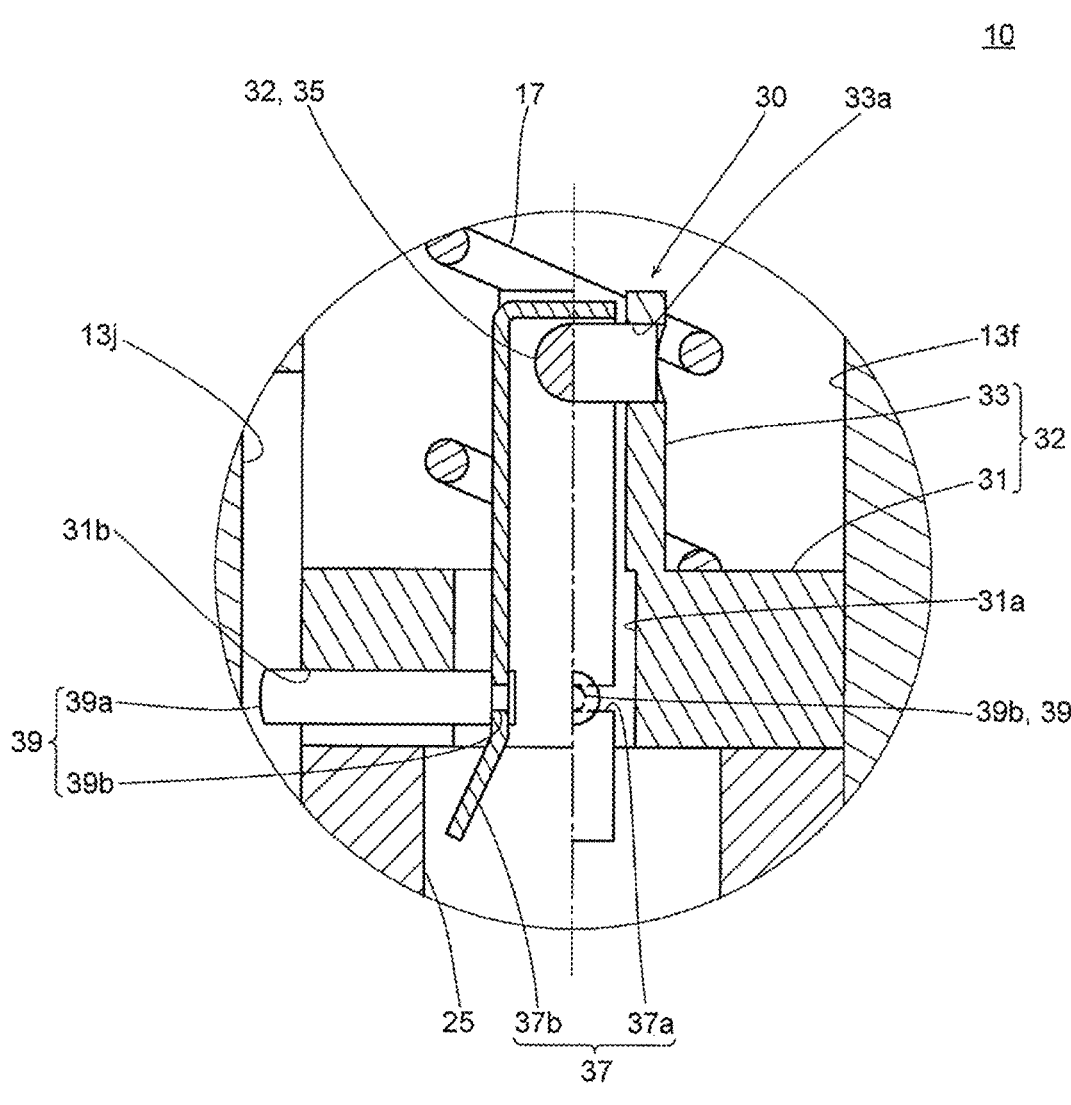
FIG. 3 is an enlarged view of III part in FIG. 1.
Figure 4:
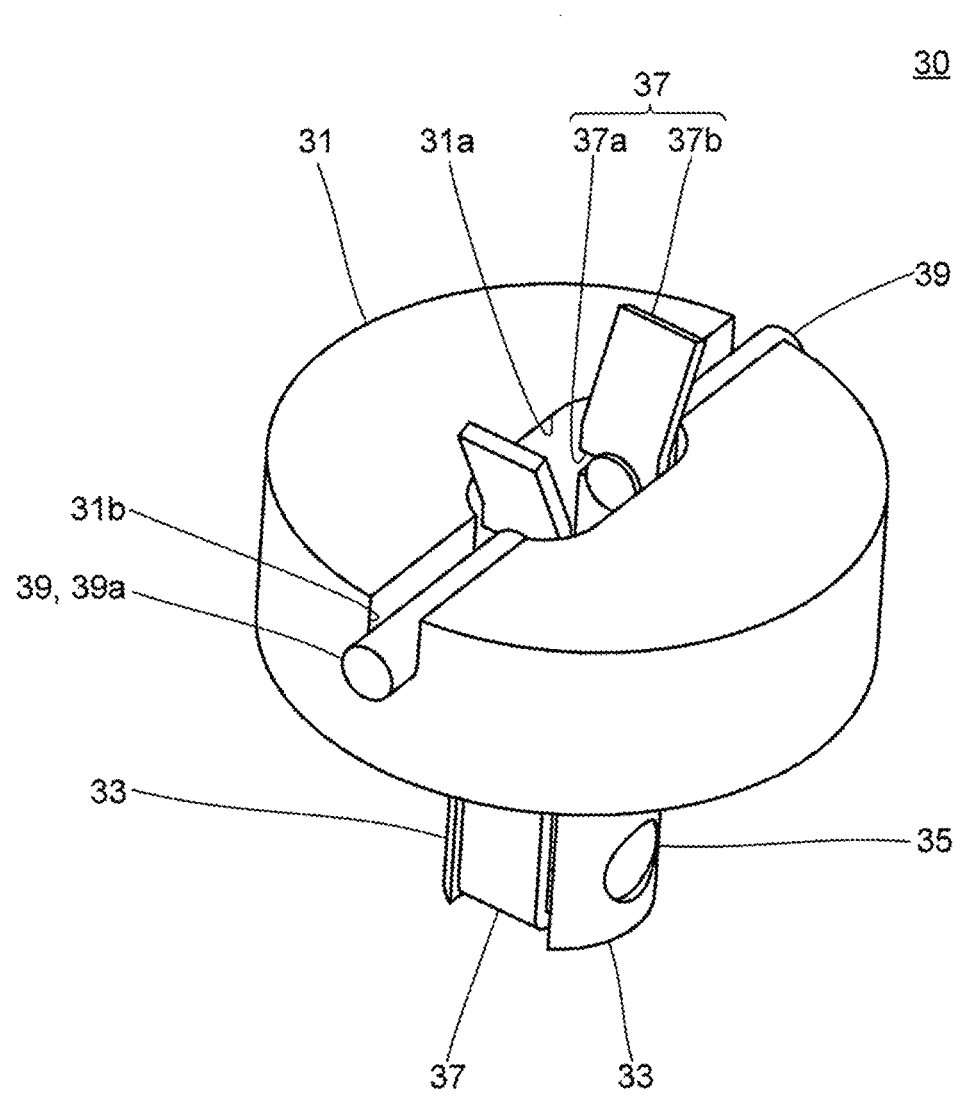
FIG. 4 is a perspective view of a pusher according to the first embodiment.

As shown in FIGS. 3 and 4, the pusher 30 includes a pusher body 32, a leaf spring (openable elastic body, first elastic body) 37, and a pair of stoppers (retaining bodies) 39. The pusher body 32 includes a slider 31, a pair of advance-retract spring guides 33, and a support pin (elastic body support) 35.

The slider 31, which has a disk shape, advances or retracts in the cylinder chamber 13f. The slider 31 has a spring chamber 31a and a receiving groove (receiving portion) 31b. The spring chamber 31a, which is located in a central portion of the slider 31, is a through hole extending axially. The spring chamber 31a has an elliptical or rectangular cross-section (see FIG. 4). The receiving groove 31b, which is disposed on the distal end surface of the slider 31, extends radially. The receiving groove 31b has a U-shaped cross-section. The receiving groove 31b penetrates from the outer periphery of the slider 31 to the spring chamber 31a.

The advance-retract spring guide 33 extends toward the basal end of the slider 31. The advance-retract spring guides 33, which are disposed at both ends of the spring chamber 31a, extends parallel to the central axis 1. The advance-retract spring guide 33 has a through-hole 33a. The advance-retract spring guide 33 has a cylindrical surface and a side surface formed of a flat surface, and has a crescent-shaped cross section. Each cylindrical surface of the pair of advance-retract spring guides 33 is the same cylindrical surface. The through-hole 33a is located at the distal end portion of each of the advance-retract spring guides 33. The advance-retract spring guide 33 guides the advance-retract spring 17.

The support pin 35 passes through the pair of through-holes 33a.

The stopper 39 includes a protruding portion 39a and a stop groove 39b. Each stopper 39 extends radially to be arranged in each receiving groove 31b. The stopper 39 has a right cylindrical shape. The protruding portion 39a protrudes from the side surface of the slider 31. The protruding portion 39a is inserted into the slide groove 13j. An inner end portion of the stopper 39 protrudes toward the spring chamber 31a. The stop groove 39b, which is a circumferential groove, is located at the inner end of the stopper 39.

When the pusher 30 advances or retracts in the cylinder chamber 13f, the stopper 39 abuts against both end portions of the slide groove 13j, thereby determining the stroke of the pusher 30.

The leaf spring 37 includes a hook portion 37a and a lever 37b. The leaf spring 37 is bent in a U-shape. A central portion of the leaf spring 37 is supported by the support pin 35. Both end portions of the leaf spring 37 penetrate the spring chamber 31a to protrude from the distal end surface of the slider 31. The hook portion 37a is disposed at both end portions (distal end portions) of the leaf spring 37. The hook portion 37a is a notch formed in the leaf spring 37. The stop groove 39b engages with the hook portion 37a. The lever 37b, which is located at both end portions of the leaf spring 37, protrudes from the slider 31. The lever 37b may slope radially outward as it moves away from the slider 31. The leaf spring 37 urges the stopper 39 radially outward.

The lever 37*b* may be disposed in the stopper 39 instead of the leaf spring 37.

Figure 5:
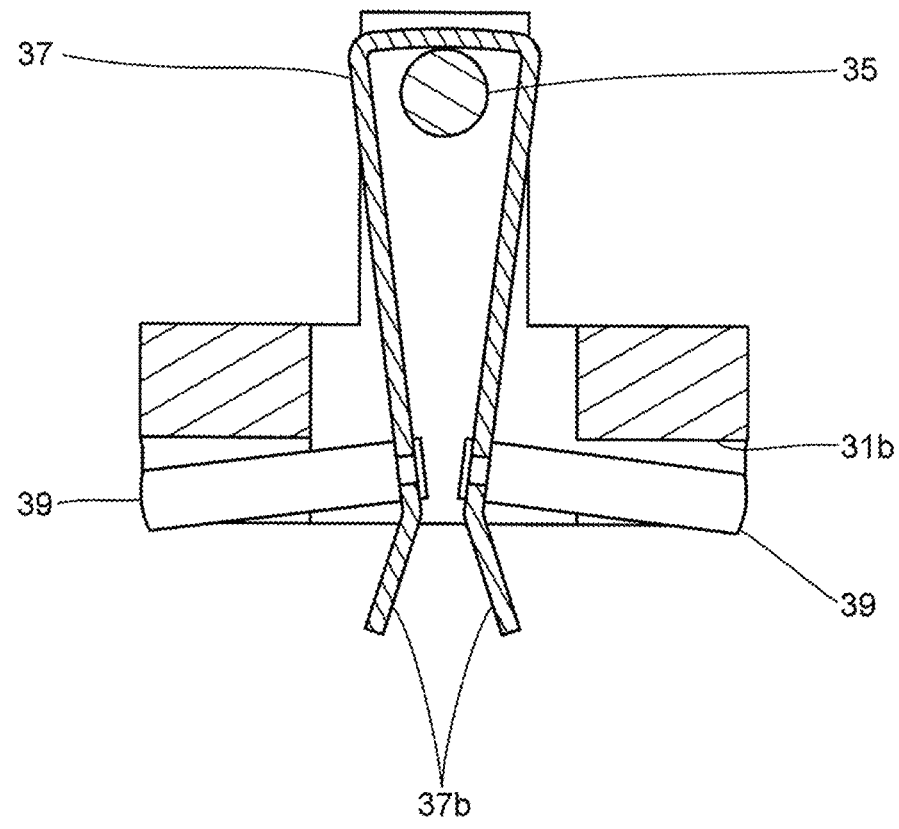
FIG. 5 is a longitudinal sectional view of the pusher according to the first embodiment when a lever is operated.

As shown in FIG. 5, when an operator moves the pair of levers 37*b* radially inward, the leaf spring 37 closes and the stopper 39 moves radially inward. At this time, with the deformation of the leaf spring 37, the stopper 39 is inclined such that the protruding portion 39*a* is raised toward the distal end. Then, the protruding portion 39*a* is detached from the slide groove 13*j*. This enables the operator to take out the pusher 30 from the cylinder chamber 13*f* toward the distal end for replacing the advance-retract spring 17.

Second Embodiment

Figure 6:
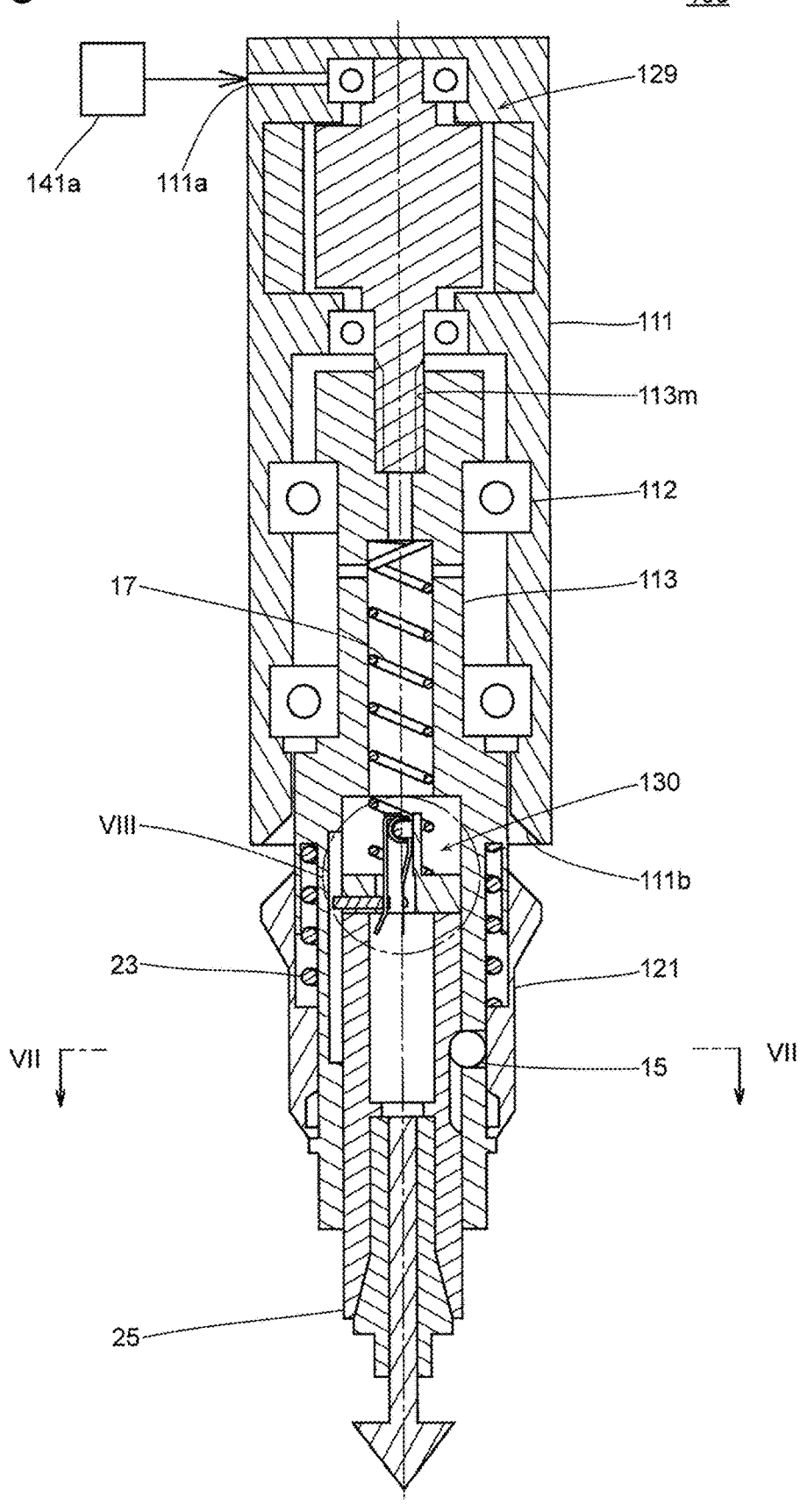
FIG. 6 is a longitudinal sectional view of a processing tool according to a second embodiment.
Figure 7:
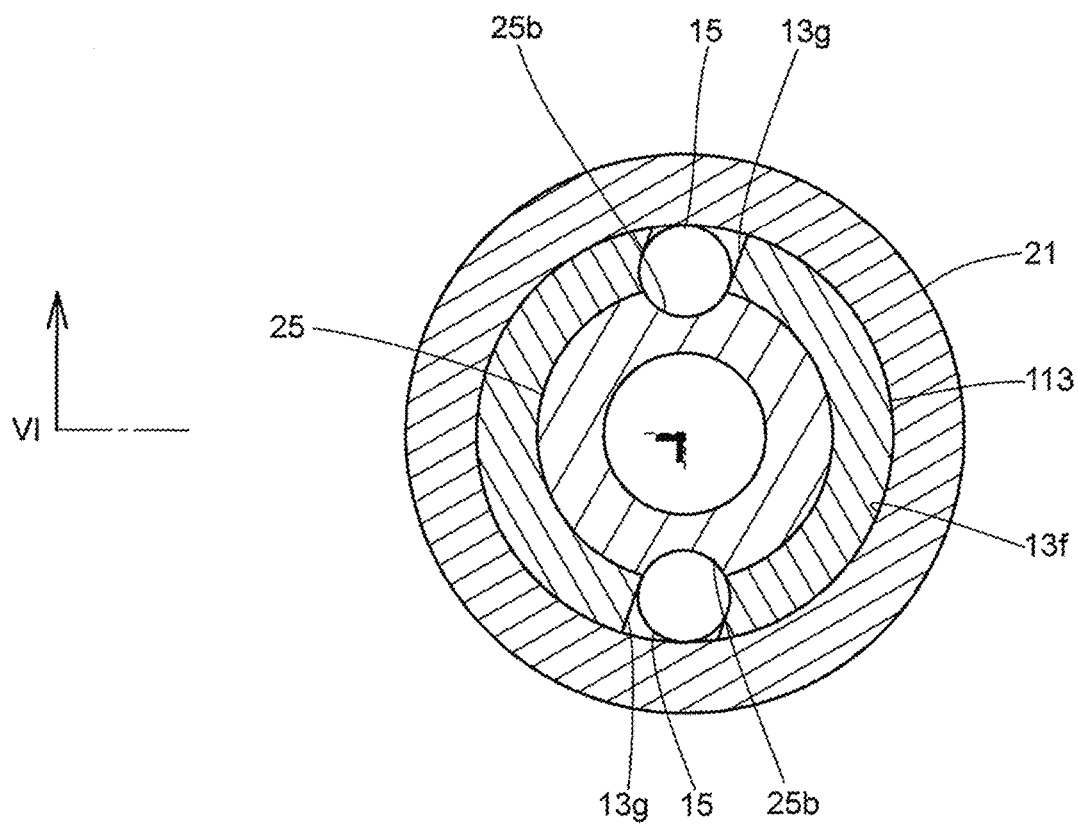
FIG. 7 is a cross-sectional view taken along line VII-VII in FIG. 6.
Figure 7:

As shown in FIG. 6, a processing tool 100 according to the present embodiment includes a cover 111, a motor 129, a bearing 112, a body 113, an advance-retract spring 17, a pusher 130, a ball 15, a trigger 121, a trigger spring 23, and a tool 25. FIG. 6 is a sectional view taken along line VI-VI in FIG. 7.

The cover 111, which is hollow cylindrical, extends along the central axis 1. The cover 111 has an air inlet 111*a* and an air outlet 111*b*. The air inlet 111*a* is disposed at a basal end portion of the cover 111. The air inlet 111*a* is connected to an air source 141*a*. The air outlet 111*b* is disposed at a distal end portion of the cover 111. The air outlet 111*b* is connected to the air inlet 111*a*.

The motor 129 is disposed at the basal end portion of the cover 111. The motor 129 is, for example, an electric motor or an air motor. When the motor 129 is an air motor, the motor 129 may be connected to the air inlet 111*a* and the air outlet 111*b*.

The body 113 is supported inside the cover 111 via the bearing 112. The body 113 has a serration hole 113*m*. The serration hole 113*m* is disposed at the basal end of the body 113. The serration hole 113*m* is connected to the motor 129. Other configurations of the body 113 are substantially the same as those of the body 13 of the first embodiment.

The trigger 121 is substantially the same as the trigger 21 of the first embodiment except that the shape thereof is different.

Figure 8:
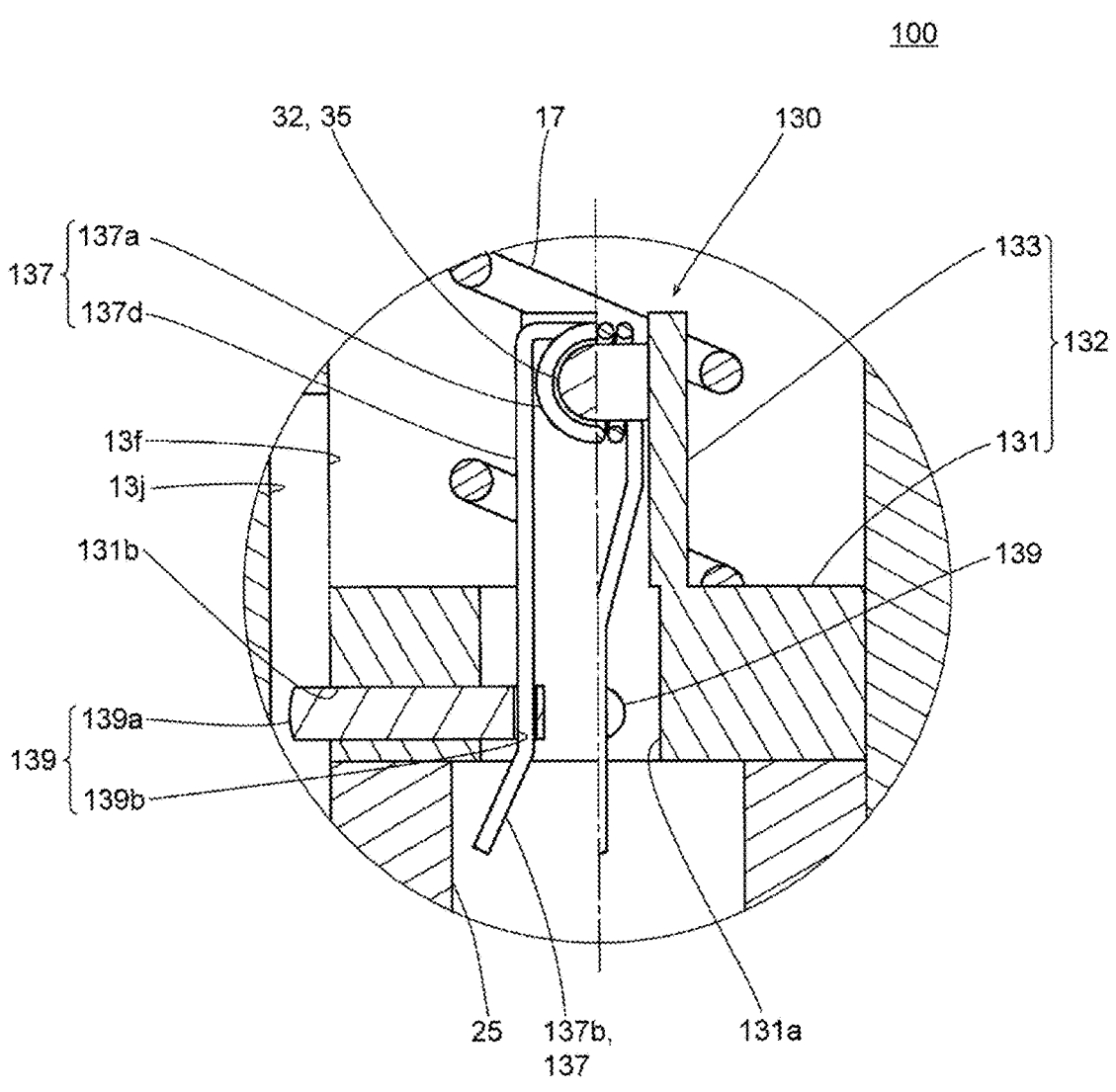
FIG. 8 is an enlarged view of VIII part in FIG. 6.
Figure 9:
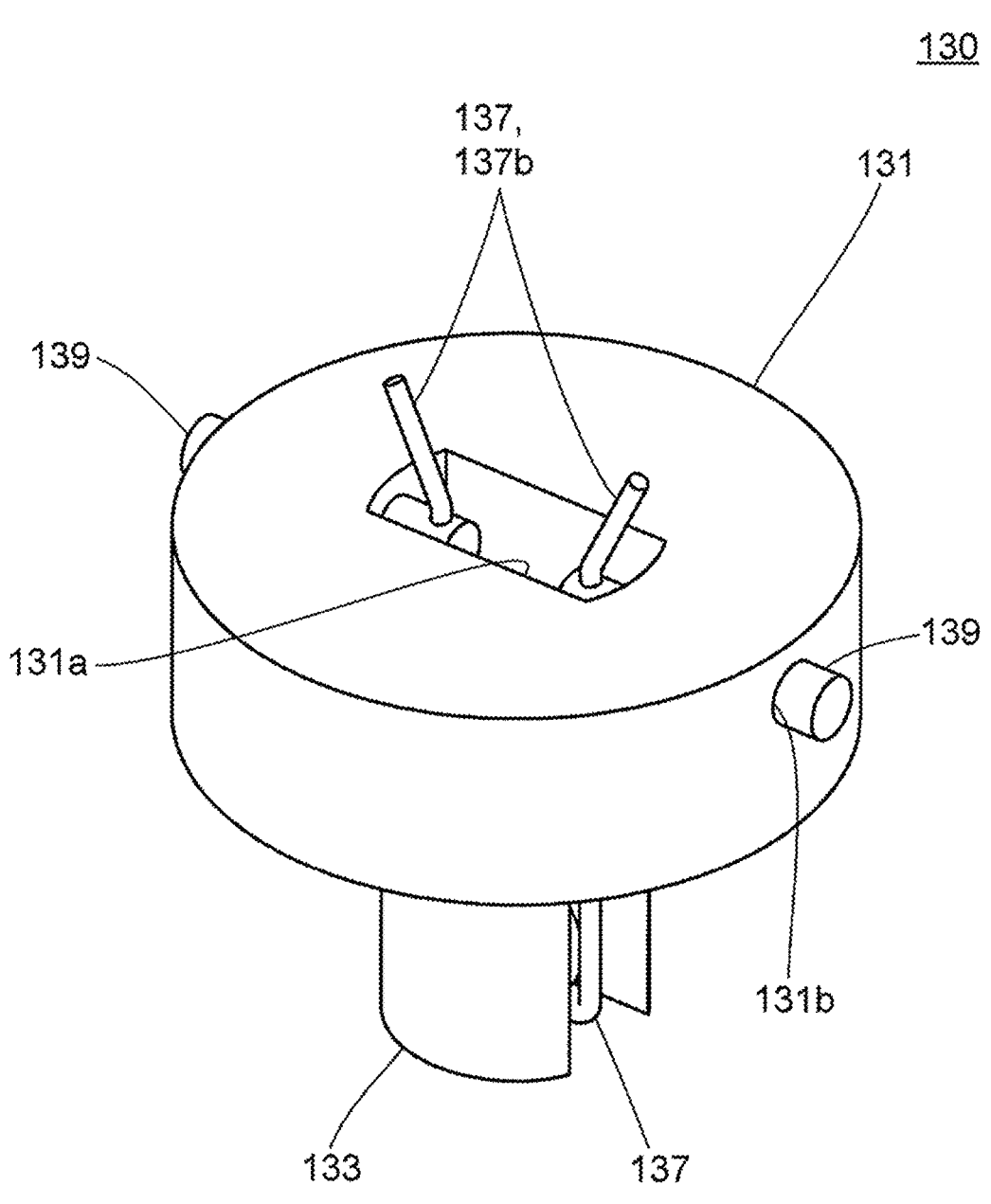
FIG. 9 is a perspective view of the pusher according to the second embodiment.

As shown in FIGS. 8 and 9, the pusher 130 includes a pusher body 132, a torsion coil spring (openable elastic body, first elastic body) 137, and a pair of plungers (retaining bodies) 139.

The pusher body 132 includes a slider 131, an advance-retract spring guide 133, and a support pin 35. The slider 131 has a spring chamber 131*a* and a pair of receiving holes (receiving portions) 131*b*. The spring chamber 131*a* is substantially the same as the spring chamber 31*a* of the first embodiment. The receiving hole 131*b* extends radially to penetrate from a side surface of the slider 131 to the spring chamber 131*a*. The receiving hole 131*b* is a cylindrical hole. The advance-retract spring guide 133 is substantially the same as the advance-retract spring guide 33 of the first embodiment.

Note that the pusher body 132 may have the receiving groove 31*b* of the first embodiment instead of the receiving hole 131*b*.

The plunger 139 has a cylindrical shape. The plunger 139 has a protruding portion 139*a* and a stop hole 139*b*. The pair of plungers 139 are respectively inserted into the receiving hole 131*b* to be guided by the receiving hole 131*b*. The protruding portion 139*a* protrudes from the cylindrical side surface of the slider 31. The protruding portion 139*a* is inserted into the slide groove 13*j*. The radially inner end of the plunger 139 protrudes into the spring chamber 131*a*. The stop hole 139*b* is disposed at the basal end of the plunger 139 to pass through the plunger 139.

The torsion coil spring 137 includes a coil portion 137*a*, an end portion 137*d*, and a lever 137*b*. The coil portion 137*a* is supported by the support pin 35. The end portion 137*d* extends toward distal end, passes through the spring chamber 131*a*, and protrudes from the distal end of the slider 131. The end portion 137*d* penetrates the stop hole 139*b*. A distal end portion (both end portions) of the end portion 137*d* serves as the lever 137*b*. The lever 137*b* may be folded radially outward. The torsion coil spring 137 urges the plunger 139 radially outward.

When the operator pinches the lever 137*b*, the torsion coil spring 137 contracts, and the plunger 139 is accommodated in the receiving hole 131*b*. Then, the plunger 139 is detached from the slide groove 13*j*, so that the operator can take out the pusher 130 from the cylinder chamber 13*f* toward the distal end. Then, the operator can replace the advance-retract spring 17.

Note that the pusher 30 of the first embodiment and the pusher 130 of the second embodiment may be replaced with each other.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

10, 100 Processing tool
13, 113 Cover
13*f* Slide groove
13*f* Cylinder chamber
25 Tool
25*b* Anti-rotation groove
30, 130 Pusher
32, 132 Pusher body
39 Stopper (Retaining body)
139 Plunger (Retaining body)
What is claimed is:

1. A processing tool, comprising:
   a body including,
      a cylinder chamber extending along the body, the cylinder chamber having an opening toward a distal end, and
      a slide groove extending parallel to the cylinder chamber;
   a tool received in the cylinder chamber in a detachably attachable manner, the tool having an anti-rotation groove on an outer periphery;
   an anti-rotation body disposed in the body, the anti-rotation body configured to advance to or retract from the cylinder chamber;
   a pusher disposed in the cylinder chamber in a reciprocable manner, the pusher configured to urge the tool toward the distal end, the pusher including,
      a pusher body,
      a retaining body radially protruding from the pusher body to be received in the slide groove, and
      an openable elastic body configured to urge the retaining body radially outward; and an advance-retract spring disposed on a basal end of the pusher in the cylinder chamber, the advance-retract spring configured to urge the pusher toward the distal end.

2. The processing tool according to claim 1, wherein the pusher includes a lever located at a distal end of the pusher, and when the lever is operated, the retaining body moves radially inward to allow the pusher and the advance-retract spring to be taken out toward the distal end of the cylinder chamber.

3. The processing tool according to claim 1, wherein the pusher body includes, a receiving portion extending radially, a spring chamber located in a central portion of the pusher body to be connected to the receiving portion, the spring chamber extending radially, and an elastic body support, the openable elastic body is supported by the elastic body support to be located in the spring chamber, and the openable elastic body is connected to the retaining body.

4. The processing tool according to claim 3, wherein the retaining body is received in the receiving portion.

5. The processing tool according to claim 1, wherein the tool has a lever receiving hole disposed in a basal end portion of the tool, and the lever receiving hole accommodates the lever.

6. The processing tool according to claim 1, wherein the receiving portion is a receiving groove located at a distal end surface of the pusher body.

7. The processing tool according to claim 1, wherein the openable elastic body is a U-shaped leaf spring including, the lever located at both ends, and a hook portion, and the retaining body has a stop groove located radially inward and engageable with the hook portion.

8. The processing tool according to claim 3, wherein the receiving portion is a receiving hole located in the pusher body, and the openable elastic body includes, a coil portion supported by the elastic body support, and an end portion having the lever.

9. The processing tool according to claim 1, further comprising:

a cover supporting the body in a rotatable manner.

10. The processing tool according to claim 2, wherein the pusher body includes, a receiving portion extending radially, a spring chamber located in a central portion of the pusher body to be connected to the receiving portion, the spring chamber extending radially, and an elastic body support, the openable elastic body is supported by the elastic body support to be located in the spring chamber, and the openable elastic body is connected to the retaining body.

11. The processing tool according to claim 2, wherein the tool has a lever receiving hole disposed in a basal end portion of the tool, and the lever receiving hole accommodates the lever.

12. The processing tool according to claim 3, wherein the tool has a lever receiving hole disposed in a basal end portion of the tool, and the lever receiving hole accommodates the lever.

13. The processing tool according to claim 4, wherein the tool has a lever receiving hole disposed in a basal end portion of the tool, and the lever receiving hole accommodates the lever.

14. The processing tool according to claim 2, wherein the receiving portion is a receiving groove located at a distal end surface of the pusher body.

15. The processing tool according to claim 3, wherein the receiving portion is a receiving groove located at a distal end surface of the pusher body.

16. The processing tool according to claim 4, wherein the receiving portion is a receiving groove located at a distal end surface of the pusher body.

17. The processing tool according to claim 5, wherein the receiving portion is a receiving groove located at a distal end surface of the pusher body.

18. The processing tool according to claim 2, wherein the openable elastic body is a U-shaped leaf spring including, the lever located at both ends, and a hook portion, and the retaining body has a stop groove located radially inward and engageable with the hook portion.

19. The processing tool according to claim 3, wherein the openable elastic body is a U-shaped leaf spring including, the lever located at both ends, and a hook portion, and the retaining body has a stop groove located radially inward and engageable with the hook portion.

20. The processing tool according to claim 4, wherein the openable elastic body is a U-shaped leaf spring including, the lever located at both ends, and a hook portion, and the retaining body has a stop groove located radially inward and engageable with the hook portion.

* * * * *